(No Model.)

W. E. BURK.
APPARATUS OR DEVICE FOR PUNCHING RUBBER.

No. 278,091. Patented May 22, 1883.

WITNESSES:
Wm A. Skinkle
H. W. Elmore

INVENTOR:
William E. Burk,
By his Attorneys,
Baldwin, Hopkins & Peyton

UNITED STATES PATENT OFFICE.

WILLIAM E. BURK, OF PHILADELPHIA, PENNSYLVANIA, ASSIGNOR TO THE S. S. WHITE DENTAL MANUFACTURING COMPANY, OF SAME PLACE.

APPARATUS OR DEVICE FOR PUNCHING RUBBER.

SPECIFICATION forming part of Letters Patent No. 278,091, dated May 22, 1883.

Application filed April 25, 1883. (No model.)

*To all whom it may concern:*

Be it known that I, WILLIAM E. BURK, of the city and county of Philadelphia, in the State of Pennsylvania, have invented certain new and useful Improvements in Apparatus or Devices for Punching Rubber for Dentists' Use, of which the following is a specification.

My invention relates more especially to a device for punching the rubber used by dentists as a dam to the passages of saliva to the tooth being operated upon. Its object is to facilitate the punching of the rubber and insure accuracy in fitting the dam upon the tooth to be operated on and upon the adjacent teeth.

The subject-matter claimed is particularly pointed out at the close of the specification.

In the accompanying drawings I have shown my improvements as organized in the best way now known to me. Some of my improvements may be used without the others, however, and in apparatus differing somewhat from that particularly shown.

Figure 1:
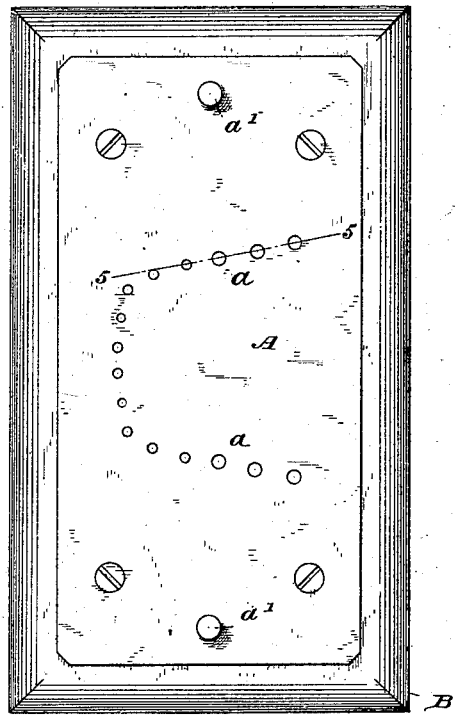
Figure 2:
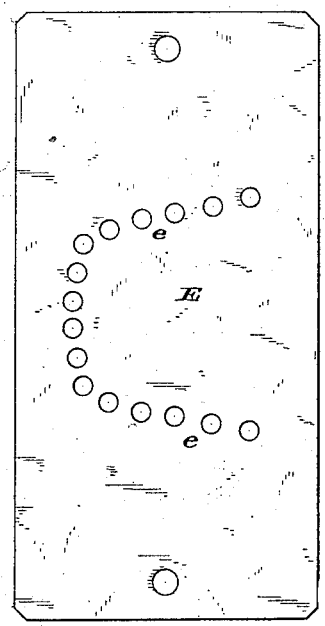
Figure 3:
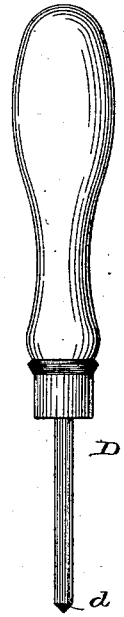
Figure 4:
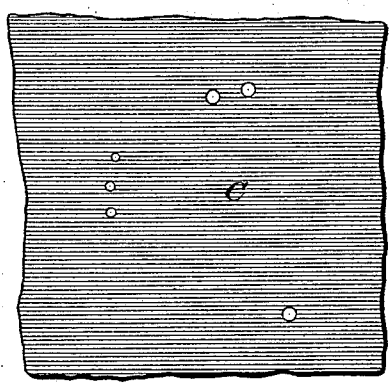
Figure 5:
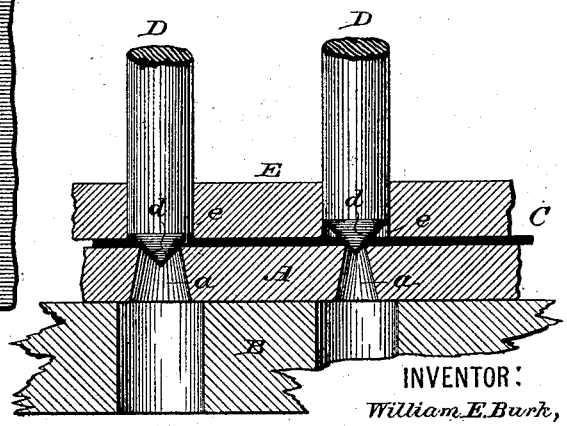

In said drawings, Figure 1 is a plan view of the lower punch-plate, showing the punch-holes therein as of different size, and arranged to correspond to the teeth of the dental arch of the human mouth. Fig. 2 is a similar view of the upper guide-plate of the apparatus, through which the punch operates upon the rubber. Fig. 3 is a view of one form of punch for use with my improvements. Fig. 4 is a view of the rubber dam, showing holes punched therein for the passage of the superior central incisors, one of the lateral incisors, the first and second molars on one side, and the third molar on the other. (This is merely for illustration.) Fig. 5 is an enlarged sectional view through the device on line 5 5 of Fig. 1, illustrating the punching operation.

A punch-plate, A, is preferably mounted upon a suitable base or frame, B, and secured thereto by screws or otherwise. Said plate A is provided with a series of punch holes or openings, *a*, corresponding in outline to the shape of the dental arch of the human mouth; and the holes also correspond in number and position, and, preferably, in relative size, to the teeth of the arch. The sheet of rubber C, constituting the dam, is spread upon the plate A, over the holes therein, and the punch is then used to punch a hole in the rubber at the location and of the size desired for incisor, cuspid, or molar teeth. By providing a plate with the series of holes corresponding in outline to the dental arch, and in number to the teeth thereof, the rubber may be punched with precision to fit over the tooth or teeth desired, and the serious objection of having to guess at the points to punch, as has heretofore been necessary, is avoided. The punching-tool D may be a plain punch having a cone point or end, *d*, and provided with a suitable handle.

The rubber is punched by the action of the cone end of the punch-tool against the cutting-edge of the punch-holes in the plate A, and the size of the hole punched by the tool is determined by the size of the hole in the punch-plate; and these holes, as has been before stated, may vary in size correspondingly with the variation in size of the different teeth. The punched-out pieces of rubber pass through the die-plate A, and escape through enlarged holes formed in the base-board B, and communicating with the holes in the punch or die plate.

For better results and greater accuracy and ease I prefer to provide a guide-plate, E, for the punch, between which and the punch or die plate A the rubber is held during the punching operation. This guide-plate is provided with a series of holes, *e*, corresponding in number and outline with the punch-holes in the plate A. Said guide-plate E is held in place upon the die-plate A by fitting over suitable guide-pins, *a'*, for instance; but the plates A and E may be hinged together at one end, or otherwise connected, to permit an opening and closing movement for the entrance and withdrawal of the rubber, if desired. The holes in the guide-plate E are preferably of the same size, and fitted to snugly receive the cylindrical punch-tool D, the cone end *d* of which, in connection with the different-sized holes in the plate A, determines, as before stated, the size of the hole cut in the dam. Fig. 5 shows the guide-plate E in position upon the plate A, with the rubber dam C held between the two.

Instead of the cone-pointed punching-tool and holes in the punch-plate, I may use a punching-tool with a cone-socket to operate in connection with a series of pins rising from the punch-plate and arranged correspondingly with the holes before described. In this case the pins will of course be of different size, so as to enter more or less into the cone-socket of the punch, and thereby determine the size of hole to be cut in the rubber.

As a further modification I may use a solid base for the punch-plate unprovided with outlet-openings for the punchings or clippings. In this case the clippings will accumulate in the holes in the punch-plate, and escape by their own elasticity from the upper ends of said holes. Again, in connection with my improved guide-plate, I may use different-sized punches without any punch-holes in the punch-plate, which latter may be made of wood, for instance.

The advantages of my improvements are that the punching of the rubber dam is facilitated, and almost perfect accuracy insured in the position of the holes cut for the teeth over which the dam is to be stretched. The valuable time of the dentist is thus saved and better results insured.

Having thus described my invention, what I claim herein is—

1. A punch or die plate for dentists' use, having a series of holes therein corresponding to the teeth of the dental arch of the human mouth, substantially as described.

2. A punch or die plate for dentists' use, having a series of holes therein corresponding to the teeth of the dental arch of the human mouth, in combination with a base or support to permit the passage of the punch-cuttings, substantially as described.

3. A guide-plate for a punch, having a series of holes therein corresponding in number and outline to the teeth of the dental arch of the human mouth.

4. The combination, with a punch-plate, of a guide-plate having holes therein corresponding in outline with the teeth of the dental arch, substantially as described.

In testimony whereof I have hereunto subscribed my name this 20th day of April, A. D. 1883.

WILLIAM E. BURK.

Witnesses:
W. STORER HOW,
FRANK L. HISE.